United States Patent [19]
Thomopoulos et al.

[11] Patent Number: 5,978,495
[45] Date of Patent: Nov. 2, 1999

[54] METHOD AND APPARATUS FOR ACCURATE DETERMINATION OF THE IDENTITY OF HUMAN BEINGS

[75] Inventors: Stelios C. A. Thomopoulos; James G. Reisman, both of State College, Pa.

[73] Assignee: Intelnet Inc., State College, Pa.

[21] Appl. No.: 08/727,288

[22] Filed: Jul. 17, 1996

[51] Int. Cl.$^6$ ........................................... G06K 9/00
[52] U.S. Cl. ........................ 382/124; 382/116; 382/125; 382/126
[58] Field of Search .................................. 382/116, 124, 382/125, 126; 283/68, 69, 78; 348/77; 356/71; 340/825.34

[56] References Cited

U.S. PATENT DOCUMENTS

| | | | |
|---|---|---|---|
| 4,721,628 | 1/1988 | Pieper | 427/1 |
| 5,239,590 | 8/1993 | Yamamoto | 382/4 |
| 5,395,444 | 3/1995 | Arndt et al. | 118/31.5 |
| 5,613,014 | 3/1997 | Eshera et al. | 382/124 |
| 5,689,576 | 11/1997 | Schneider et al. | 382/124 |
| 5,732,148 | 3/1998 | Keagy et al. | 382/115 |
| 5,737,071 | 4/1998 | Arndt | 427/1 |

OTHER PUBLICATIONS

Thomopoulos, S.C.A., Reisman, J.G., Fusion–Based, High Volume Automated Identification System (AFIS), Proceedings of SPIE vol. 2093, pp. 584–591.

*Primary Examiner*—Christopher S. Kelley
*Assistant Examiner*—Sheela Chawan

[57] ABSTRACT

Methods and apparatus for the accurate determination of the identity of human beings by comparing a fingerprint image with previously recorder templates utilize an oil impregnated material to condition a finger by releasing a controlled amount of a lubricant on the finger prior to recording the finger with an electronic scanner. The conditioned finger in then scanned and a fingerprint image is acquired. Different orthogonal sets of features, including but not limited to, minutiae and meniscus or global ridge frequency information are extracted from the fingerprint image. To enhance the matching accuracy, these features are then fused using a rank score combining method. The fused score is compared to a threshold to identify the human being. During the scanning process, the scanned finger is monitored electronically to determine the consistency in position, the quality of the image, and the stationary of the finger. Audible and visual feedback is provided electronically to assist the human being to better position, lubricate, or dry the finger and repeat the process. An apparatus that includes the oil impregnated material in various forms achieves the desired level of lubrication by releasing a controlled amount of lubricant mixture either under mechanical pressure from the finger of a human being, or through an electromechanical device that exerts pressure on the oil impregnated material that releases the controlled amount of lubricant. An apparatus for the accurate determination of the identity of a human being includes an interface that can multiplex a fingerprint scanner with a keypad and a card reader is any desired combination, and network multiple such apparatuses in a daisy chain using the same host computer. The information is provided in the form of any or in combination with any alphanumeric personal identification number, identification number stored in a card, and fingerprints, and is used to create multiple security levels by configuring the same hardware in different ways. A network interface makes possible to interconnect multiple apparatuses in a daisy-chain using an inexpensive RS485-to-RS232 converter or through a local area network.

4 Claims, 11 Drawing Sheets

METHOD AND APPARATUS FOR ACCURATE DETERMINATION OF THE IDENTITY OF HUMAN BEINGS

BACKGROUND

1. Field of the Invention

This invention relates to methods and apparatus for identifying human beings, specifically to an improved method for reading and analyzing fingerprints. This invention is also useful for acquiring better quality fingerprints without the need of ink or lubricating gel for law enforcement applications.

2. Description of Prior Art

Fingerprints have been a safe means for uniquely identifying human beings for over one hundred years. So far there has not been a single instance of two human beings having the same fingerprints. Fingerprints have been used for human identification by law enforcement for a long time. Recently, as technology has become available, fingerprints have been used for real-time human being identification in access control applications, personal identification (ID), ID verification, in documenting the time of attendance, identification of intruders, and similar applications.

Despite the long history of fingerprints and the reliable identification that they offer, it has been very hard to achieve the same level of identification accuracy with an electronic fingerprint recognition system as is possible by an experienced fingerprint forensic analyst. The discrepancy in the level of identification accuracy with the existing electronic systems is attributed to various reasons. The main reasons primarily relate to:

(a) the weakness of existing electronic systems to extract the characteristic points (Minutiae) from a fingerprint reliably and consistently;

(b) the weakness of the existing electronic scanners to compensate for natural variations and wear of the fingerprint due to dryness from dry and cold weather, the cracking due to hard water, soap, detergent, and contact with abrasive surfaces;

(c) the weakness of existing software to compensate for the variations caused by the conditions enumerated in (b) above.

Substances that have been used traditionally by law enforcement to compensate for the tear and wear of the fingerprint of a human being include ink and clear gel. Both means of compensation are messy, leave residues on the finger, and thus completely inadequate for real-time fingerprint capturing for repetitive use of the fingerprint as required in access control applications, personal ID verification, time of attendance determination, and for intrusion control, etc.

Traditionally fingerprint identification systems rely on Minutiae to identify the person to whom the fingerprint belongs to. Minutiae are the points of termination of a ridge, or the points of bifurcation of a ridge in a fingerprint. Practically all methods of fingerprint matching from the Prior Art are based on Minutiae matching. Although Minutiae constitute an irrefutable means of fingerprint matching, the accuracy of Minutiae matching is questionable under a wide variety of finger conditions. For example Minutiae become very unreliable as a means of matching, when a fingerprint is chapped, dry and, in general, worn out from natural wear. Chapped, dry, or worn out fingerprints produce random sets of Minutiae either because ridges become fragmented or because they become very faint to detect. In either case, Minutiae become an unreliable means of accurately identifying fingerprints, and thus the identity of a human being from them.

In our invention, as it will become clear in the next section, the matching method that we use relies on fusing the information contained in the Minutiae with information extracted from another orthogonal set of features that relates to the ridge frequency. By ridge frequency, we imply the rate of succession between ridges and valleys in the fingerprint image at any given direction on the image plane. The ridge frequency information provides information that can be used to discriminate one fingerprint from another. This information is referred to as Meniscus or Global in the invention.

By fusion we mean the process of integrating two different sets of data in a meaningful way. In order to maximize the beneficial results from fusion, the data sets must be orthogonal in the sense that the information in one data set compliments the information from the other. This complimentarity of information is crucial in achieving enhanced performance after fusion of different data sets.

One important attribute of the Meniscus or Global feature set is that it is orthogonal to the Minutiae features in the sense that the microscopic Minutiae structures are not affected by the macroscopic Meniscus/Global ridge structures. This orthogonality is important in our invention, because it allows to fuse the information from the two feature sets in a complimentary fashion, thus enhancing the fingerprint matching accuracy beyond what is feasible by each method individually. Moreover, the two feature sets are structurally complimentary, so when one set becomes unreliable due to finger degradation, the other still maintains a level of quality that allows to do accurate identification. So, the orthogonality allows to use both sets synergistically by fusing them, and enhance the identification accuracy after fusion.

Fusion has been used in other fields and the inventors have many contributions in the field of fusion. However, fusion has never been applied before for human being identification by combining information contained in different orthogonal feature sets from the same fingerprint with the purpose to reduce or, even eliminate all together, the false rejection and false acceptance rates when matching one fingerprint against another. False rejection rate is defined as the rate of failure of a properly authorized human being. False acceptance rate is defined as the rate of acceptance of an unauthorized human being. Although fusion of Minutiae with Meniscus or Global features provides an identification method far superior in terms of accuracy than any method in the Prior Art, there are circumstances that a finger may be either extremely chapped, dry, or worn out from weather, temperature, manual labor, or dirt, that does not leave a trace (fingerprint) on the scanner to capture. Under these conditions, no identification method, no matter how sophisticated can be used for identification: the fingerprint it's not there. It is precisely this situation that our invention provides the only possible remedy for: a conditioning apparatus that when in contact with the finger releases a controlled amount of lubricant, or lubricant mixture, that rebuilds the fingerprint structure so that it becomes visible to the scanner. Furthermore, the same conditioning apparatus can be used to enhance the fingerprint quality so that tighter security levels can be used in a system that identifies human beings from fingerprints.

OBJECTS AND ADVANTAGES

This patent describes the use of an oil impregnated material or, similarly an apparatus, that releases a controlled amount of lubricant, or a lubricant solution with a disinfectant and fragrant, when in touch with an fingerprint and/or under pressure for conditioning a finger prior to, or during, or after the process of capturing the fingerprint either electronically or mechanically on paper or other solid surface. The term conditioning throughout this invention indicates a process of lubricating and/or cleaning and/or controlling excessive moisture from a finger. This invention also describes a new use of an oil impregnated material, the MICROPOLY, or any variant of it manufactured by PhyMet Inc. of Ohio, or any similar material or version of the above, that can release a controlled amount of lubricant, or a mixture of lubricant with fragrant and/or disinfectant, on the finger, when the material is touched or subjected to pressure, and can be used to condition the finger prior to scanning in order to compensate for the wear of the fingerprint caused by any of the reasons mentioned above. The use of this material in the real-time fingerprint recognition system for which this patent is filed, allows to use the fusion method for which this patent is filed to achieve negligible probability of false acceptance while maintaining very low false rejection rate. The combination of these two attributes, negligible false acceptance probability and very low rejection rate, make the system for which a patent is filed unique and provide the operational assurance required by the industry to make the use of fingerprints mainstream in access control, security applications, ID verification, time attendance application, or any related application where identification of a human being is desired.

Accordingly, several objects and advantages of our invention are:

(a) to provide a non-intrusive, non-objectionable means for fingerprint conditioning, whereas the prior art in this area provides non-friendly, intrusive, and messy substances for finger conditioning;

(b) to provide a fingerprint processing and matching method that, in conjunction with object (a), guarantees negligible false acceptance probability at very low false rejection rate, whereas the prior art in this area has failed to deliver systems that reliably guarantee low false acceptance and low false rejection rates;

(c) to provide an apparatus that incorporates both objects (a) and (b) to realize a high integrity, high reliability real-time fingerprint recognition system, whereas the prior art in this area does not have a system that provides acceptable means for conditioning fingerprints and matching techniques to guarantee the low false acceptance and false rejection rates acceptable in real-time fingerprint recognition systems; and (d) to provide an apparatus that can integrate fingerprint scanning capabilities with keypad technology and card reader technology and the software to go along with it, so as a security network can easily be built by daisy-chaining those apparatuses to allow for cost-effective security solution to realize an onion-like security concept, whereby the outermost vulnerable perimeter layer is protected by the use of fingerprint verifiable Personal Identification Numbers (PINs) or card passwords, and the less vulnerable interior layers may be protected by conventional keypad or card reader security devices that do not require user ID verification. The prior art in this area does not offer systems that are configurable for multiple ID elements, such as PIN, password, and fingerprints in any desirable combination all operating off the same database and capable of being connected on the same network.

Further objects and advantages of our invention will become apparent from a consideration of the drawings and ensuing description.

SUMMARY OF THE INVENTION

In summary, the method and apparatus for accurate measurement of the identity of human beings is:

1. A method for accurately determining identity of a human being comprising the steps of:
   a. conditioning a finger (100) of said human being by bringing said finger in contact with a material or device (102) that releases a controlled amount of lubricant on the surface of said finger containing unique identifying characteristics;
   b. capturing a fingerprint image (110) of said lubricated finger (103) electronically with a scanner (104) or by leaving an imprint of said finger mechanically on a surface; and identifying said human being either by processing said fingerprint image electronically with a computer (106) or manually by visual inspection.

2. A method for achieving superior identification of a human being comprising the steps of:
   a. extracting Minutiae (172) from said fingerprint image and feature matching (178) said Minutiae (172) by ranking against other Minutiae templates in a database;
   b. extracting Meniscus or Global ridge frequency features (174) from said fingerprint image (170) and feature matching (178) by ranking said Meniscus or Global ridge frequency features (174) by ranking said Meniscus or Global ridge frequency features against candidate templates from said finger (103) in said database;
   c. fusion (180) of rank scores from said Minutiae (172) features with said Meniscus or Global (174) ridge frequency feature sets to achieve superior identification accuracy of said human being.

3. A method for improving the quality of a fingerprint image (126) from a dry, chapped, or dirty finger (123) of a human being, comprising:
   a. use of an oil impregnated material (102), or a similar material impregnated with lubricant or mixture of lubricant with fragrant and disinfectant capable of releasing a controlled amount of lubricant on said finger (123) under contact or pressure;
   b. use of a scanner (104) for capturing a high quality unfragmented fingerprint image (126) possessing unbroken ridge structure of said conditioned dry, chapped, or dirty finger (125) for identifying said human being.

4. An apparatus for improving quality of a fingerprint image (126) of a human being comprising:
   a. the use of oil impregnated MICROPOLY material (132), or equivalent material impregnated with lubricant or mixture of lubricant with fragrant and disinfectant, in the form of inkless stamp pad (158), pellet (132), screw-on pellet (162), or an electromechanical dispenser (164), that includes said pellet (160) of oil impregnated MICROPOLY material (132) and a plate (168) and spring (116) mechanism to exert pressure on said pellet (160), each capable of releasing a controlled amount of lubricant on finger 123) under contact or pressure; and
   b. means for capturing a high quality unfragmented fingerprint image (126) of said conditioned finger (125) for identifying said human being.

5. An apparatus (128) for identification of a human being from fingerprints comprising:
   a. a pellet (132) of oil impregnated MICROPOLY material (132), or equivalent conditioning material or device to lubricate, clean, deodorize, or disinfect a finger prior to placing said finger on a scanner (104);

b. a scanner (104) for capturing a fingerprint image (126);

c. means for identifying said human being by extracting features from said fingerprint image and comparing and matching said features with features from other fingerprint images in a database.

6. A method for the identification of a human being comprising:

a. use of a fingerprint image (126);

b. use of two orthogonal sets of features, Minutiae (172) and Meniscus or Global (174);

c. a matching scores fusion (180) algorithm that fuses the rank matching scores of said Minutiae (172) with matching score of said Meniscus or Global (174) and possibly other orthogonal feature sets (176).

7. An apparatus for transmitting data on a serial RS232 port of a computer (106) over longer distance, comprising:

a. an enable timer (250);

b. an LED driver (252);

c. LEDs (254);

d. an RS232 interface (256);

e. An RS485 interface (258); and f. means for providing bi-directional inexpensive conversion of a RS485 signal line 148 to RS232 signal line.

In summary, this invention is a method and apparatus that, in conjunction with the new use of an oil impregnated material, allows the accurate identification (verification of ID) of a human being from the fingerprints of the said human being. The apparatus consists of an electronic interface, FIG. 5, that can read the fingerprint of a human being, a PIN, information stored in a card, and verify the identity of a human being from any combination of these three pieces of information. The finger is conditioned first by touching or pressing against, or activating a release mechanism, that lubricates the finger, and/or clears the finger, and/or removes excessive moisture from the finger, passively or actively the finger by a controlled amount of lubricant, or mixture of lubricant with disinfectant and/or fragrant.

An implementation of such a conditioning apparatus is described in our invention, whereby the oil impregnated material MICROPOLY, manufactured by PhyMet, Inc., of Ohio, or any variant of it that includes lubricant, oil, fragrant, alcohol, and disinfectant in any combination, is used to condition the finger by either touching on or pressing against its surface either with the finger or by mechanically by a mechanism or another human being. After conditioning the finger of a human being is tested for quality to guarantee an average pixel intensity level above a certain threshold. This test guarantees that the quality of the fingerprint image is such that the false rejection probability is low. Low false rejection probability is critical to the success of any system that relies on fingerprints to verify the identity of a human being.

During the scanning process, the finger is calibrated electronically to ensure consistent position of the finger on the scanner's field of view. Audio and visual feedback is provided to enable the human being to adjust the finger on the scanner to the correct position. A fingerprint image is captured only when the finger is correctly positioned, thus further reducing the probability of false rejection. The captured fingerprint image is then electronically processed and encoded by extracting one or more sets of features from it. These features are matched against templates that contain similar features from the fingerprint that were recorder previously. Each set of features is matched against a template from similar features and a similarity score is obtained this way for each feature set. The natural variability and wear of a finger may compromise the ability of one particular feature set to accurately discriminate between the correct match and an impostor.

To avoid this degradation in the identification of a human being from fingerprint(s), multiple features sets are fused together by combining their individual scores into a composite score, thus further reducing the probability of false rejection and minimizing the probability of false acceptance. In order to benefit from fusion, the fused feature sets must be orthogonal to each other, in the sense that each one must provide different and complimentary information from the others. Moreover, the choice of orthogonal feature sets must be such that, that when the quality of the information in one set is compromised due to the condition of the finger, the information in the other feature set or sets is maintains its integrity and can be used to identify the human being accurately. The two feature sets in our invention, namely the Minutiae and Meniscus or Global, meet the two criteria of (a orthogonality, and (b) complementarity.

The use of the conditioning material in conjunction with the use of fusion of scores from multiple (more than one) orthogonal feature sets allows one to achieve negligible false acceptance rate while maintaining a very low false rejection rate. The combination of negligible false acceptance rate with low false rejection rate alleviates practically all problems that emerge from worn-our fingers and mainstreams the use of fingerprints as a reliable and consistent means for the identification of human beings. The new use of material can also be used as a substitute for ink and messy gel lubricant used now in fingerprinting by law enforcement. The invention includes a new apparatus that allows one to implement this method of identification of a human being from fingerprints and integrate a fingerprint scanner with alphanumeric keypad and/or electronic card reader of any type, and the interconnection of multiple such apparatuses in a network through a serial (daisy-chain) connection or a local area network.

The invention includes a video relay that allows one to daisy-chain in a network multiple interface boards that are used in the reading process of fingerprints, PINs, and electronic information on any type of a card, and an invented new design of a bi-directional RS232-to-RS485 converter for long-distance connections. This circuit consists of a one-shot timer that enables the transmission of data of the RS485 network for a set time period from the last "mark" bit sent out by the host computer. This automatic enabling feature is necessary for the host software to work under Windows. (Windows is a trade mark of Microsoft Corporation.) That is because conventional RS485 converters on the market require the Request-To-Send (RTS) line to be controlled by the host software to enable transmission on the network. Windows will not allow a program to control the RTS line. Automatic versions are available but are very expensive because of the digital timing circuitry required. Our invention uses an inexpensive analog timing circuit with loose timing tolerances for the special case where the network protocol does not require disabling of the transmitter the instant the last bit is sent. The User Interface Adapter (UIA) has been designed with such a protocol. The Enable Timer circuit is implemented with half of a very inexpensive comparator Integrated Circuit (IC). The total number of chips required for the entire converter in only three, as shown in FIG. 10.

REFERENCE NUMERALS IN DRAWINGS

Figure 1:
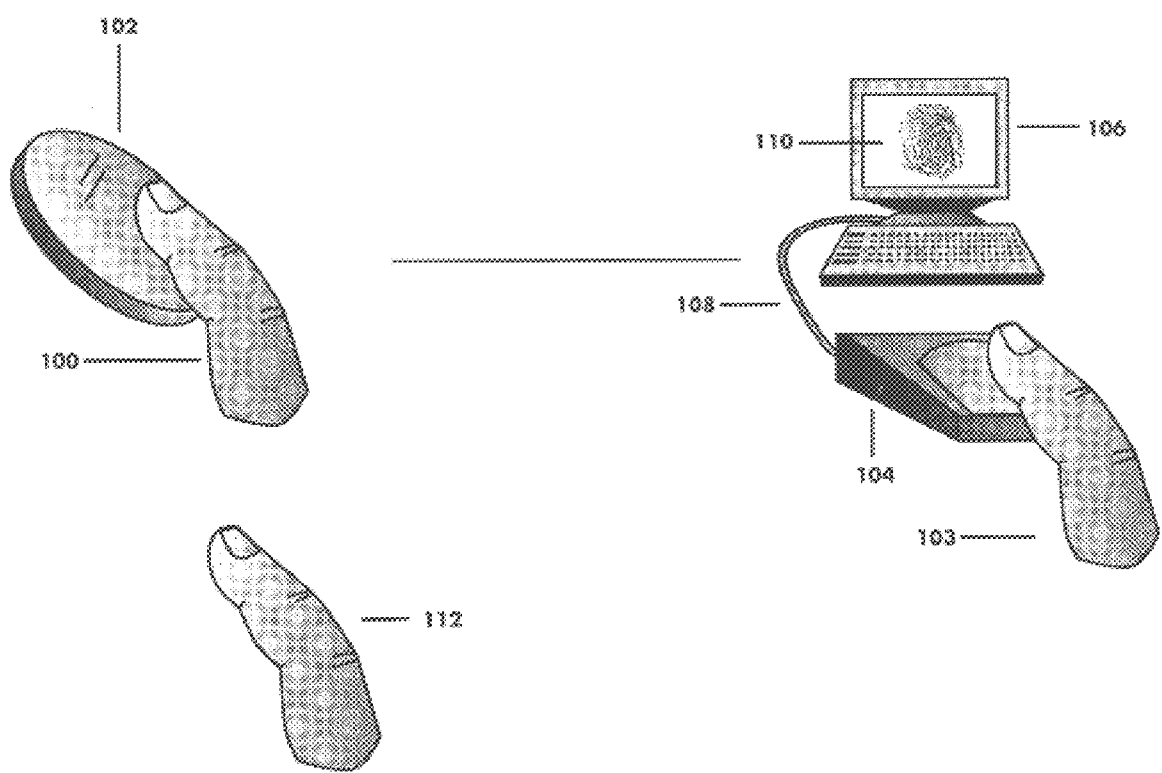
FIG. 1 is a schematic perspective view of the invented finger conditioning method with oil impregnated material.

100 Finger of a human being
102 Oil impregnated material
103 Conditioned finger
104 Scanner
106 Computer
108 Set of cables
110 High quality unfragmented fingerprint image
112 Clean finger
114 Lubrication surface
115 Lubricant gel
116 Lubricant gel drops and residues
118 Gel lubricated finger
119 Wet finger
120 Low quality, smudged fingerprint image
121 Washing facility
122 Drying facility
123 Dry, chapped, or dirty finger
124 Poor quality, fragmented fingerprint
125 Conditioned dry, chapped, or dirty finger
126 High quality, unfragmented fingerprint image
128 Integrated apparatus for human being identification
130 Card reader
132 Oil impregnated MICROPOLY, or equivalent conditioning material
134 Display
136 Alphanumeric keypad
137 Local area network (LAN) cable
138 Integrated apparatus for human being identification with fingerprint scanning and alphanumeric keypad
140 An integrated apparatus for human being identification with alphanumeric keypad
142 An apparatus for human being identification with fingerprint scanning and card reader
144 Integrated apparatus for human being identification with card reader
146 Integrated apparatus for human being identification with alphanumeric keypad and card reader
148 RS485 communication protocol cable
150 Video cable
158 Oil impregnated material lubricant pad
160 Pellet
162 Screw-shaped pellet
164 Mechanical or electromechanical lubricant dispenser
166 Spring
168 Adjustable height and/or pressure receptacle
170 A Fingerprint
172 Minutiae
174 Ridge frequency information (referred to as Meniscus or Global features)
176 Other orthogonal features (optional)
178 Feature matching scheme
180 Matching score fusion scheme
181 Fused matching scores
182 Matching characteristic with Global features only
184 Matching characteristic from Minutiae features only
186 Matching characteristic with fused Minutiae and Global features.
188 Matching accuracy characteristics
200 Microcontroller
202 Microcontroller bus
204 Address latch
206 Address decoding logic
208 ROM (Read Only Memory)
210 Additional ROM
212 Switch Interface
214 Numeric Keypad
216 Alphabetic Keypad
218 Configuration switches
220 Control register
222 Door latch relay driver
224 Video relay driver
226 Cover motor relay driver
228 LCD (Light Coupled Display) backlight driver
230 Backlit LCD display
232 CPU expansion port
234 Audio amplifier
236 Speaker
238 RS232 network interface
240 RS485 network interface
242 Card reader
244 External switch interface
246 Door latch relay
248 Video relay
250 Enable timer
252 LED (Light Emitting Diode) driver
254 LEDs 256 RS232 Interface
258 RS485 Interface

DETAILED DESCRIPTION OF THE INVENTION AND BEST MODE FOR CARRYING OUT THE PREFERRED EMBODIMENT

Referring to FIG. 1 a typical fingerprint image capturing process according to this invention is described whereby a finger of a human being 100 is first conditioned using an oil impregnated material 102. Finger conditioning is achieved by pressing or rotating the finger 100 against the oil impregnated material 102 to provoke the release of a controlled amount of the lubricant from the oil impregnated material 102. The lubricant can be any oily substance, or any mixture of oily substance with fragrant or disinfectant or both. The finger 100 after conditioning 103 is placed on a scanner 104 and a high quality unfragmented fingerprint image 110 is captured by a computer 106 which is connected to the scanner via a set of cables 108. Conditioning of the finger 100 with a mixture of a lubricant, fragrant and disinfectant achieves: (a) the lubrication that is required to condition the finger 100 against dryness, chapping, dirt, or wear-out so as to guarantee the quality fingerprint image 110; (b) deodorizes the finger with a pleasant sent; and (c) disinfects both the finger 100 and the scanner 104 after each use and makes the use of our invention contamination-free, safe to use. The high quality fingerprint image 110 is then processed and matched against one or more candidate templates from a database to identify the human being. The human being leaves the fingerprint identification process with a clean finger 112 without the need of washing or drying the finger 100 after conditioning 103.

Figure 2:
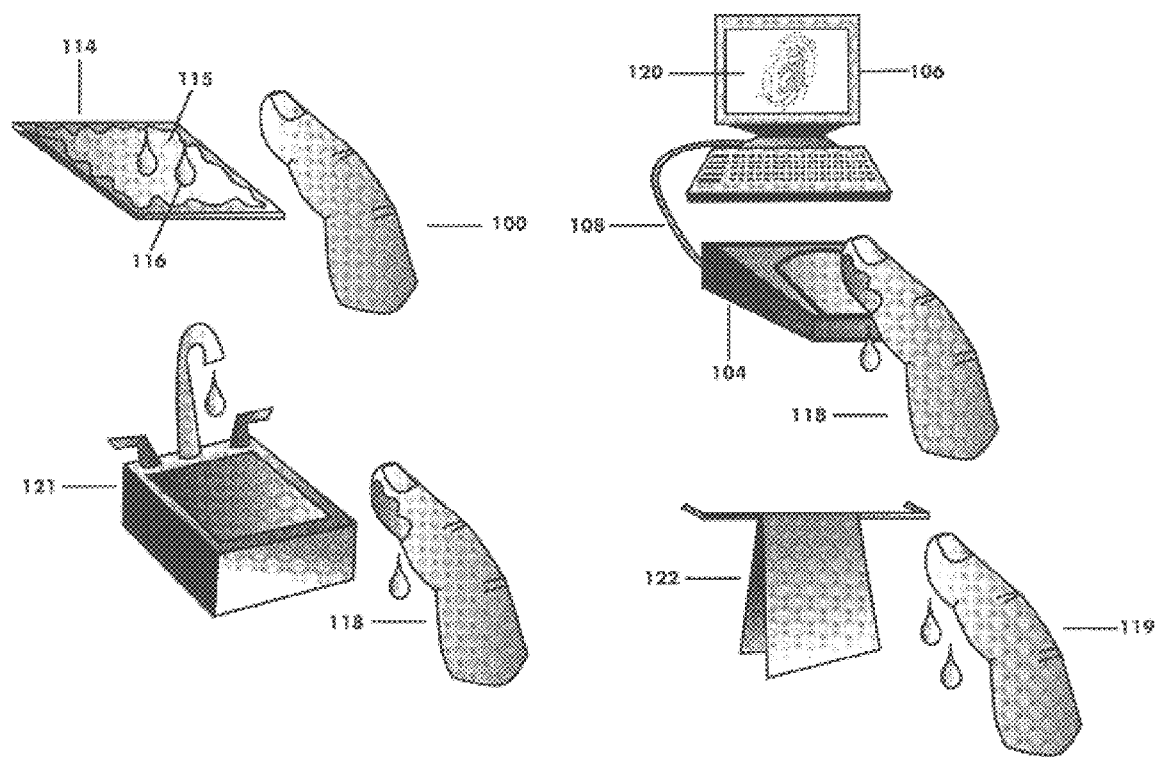
FIG. 2 is a schematic perspective view of a prior art fingerprint conditioning process using messy lubricant gel as done by prior art.

Referring to FIG. 2, a typical cumbersome and messy finger conditioning process according to prior art is described, whereby the finger 100 is first deepen in and covered with a light and/or sound conducting lubricant gel 115 on a lubrication surface 114 with lubricant gel 115. A gel lubricated and gel dripping finger 118 is then placed on the scanner 104 and a low quality, smudged fingerprint image 120 is captured by the computer 106 which is connected to the scanner through the set of cables 108. The low quality, smudged fingerprint image is processed and matched against one or more templates from a database with questionable accuracy due to the low quality and smudges. At the end of the fingerprint identification process, the gel lubricated finger 118 requires washing with soap and water in a washing facility 121 and the wet finger 119 requires drying with towel (cloth or paper) in a drying facility 122. Moreover, the gel conditioning process has left messy lubricant gel drops and residue 116 on the lubrication surface 114, the scanner 104, and the gel lubricated finger 118 before it is cleaned off.

Figure 3:
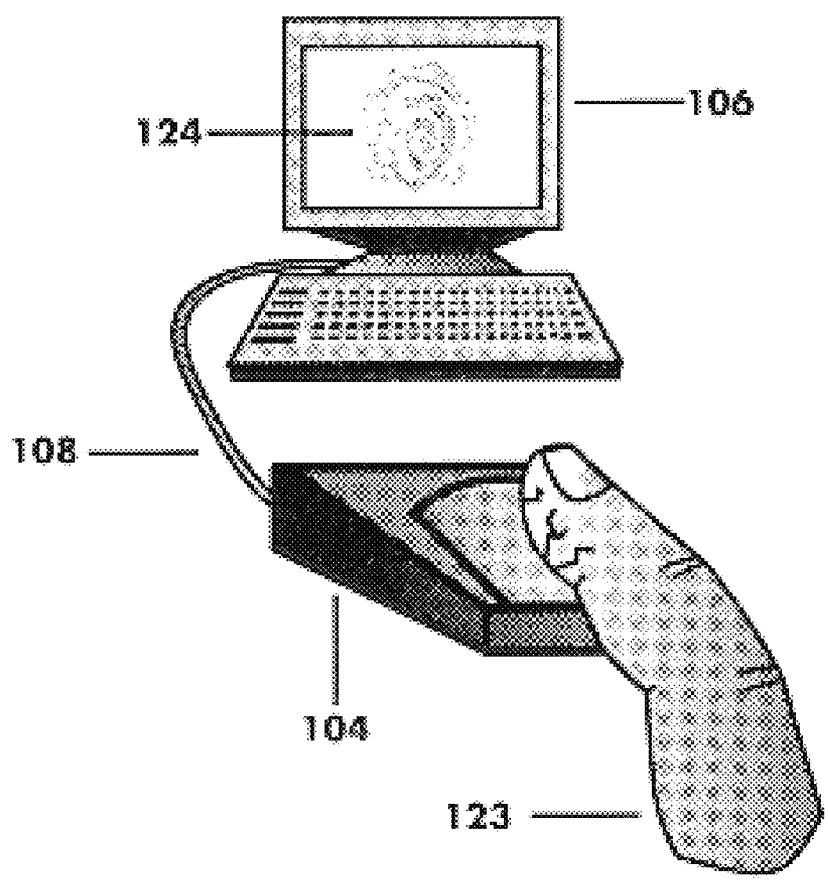
FIG. 3 is a schematic perspective view of prior art showing the poor quality fingerprint image captured by a scanner when the scanned finger is dry, chapped, or subject to natural wear without the use of conditioner (lubricant)

Referring to FIG. 3, a typical fingerprint scanning process of a dry, chapped, or dirty finger 123 according to prior art, wherein the dry, chapped, or dirty finger 123 is placed on the scanner 104 without prior conditioning. The poor quality, fragmented fingerprint image 124 which is captured by the computer 124 which is connected to the scanner through the cable 108 is unacceptable for the accurate identification of identification of a human being.

Figure 4:
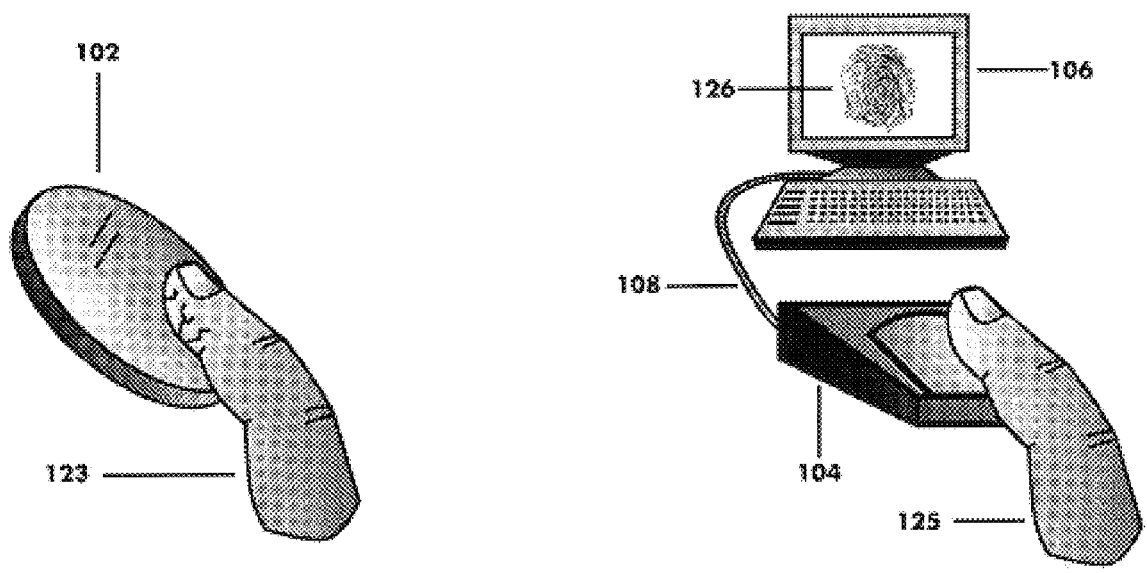
FIG. 4 is a schematic perspective view showing the superior quality fingerprint image of the same dry, chapped, abraded or worn out finger of FIG. 3, when the finger is first conditioned (lubricated) with the new oil impregnated material prior to being scanned.

Referring to FIG. 4, according to our invention, when the same dry, chapped, or dirty finger 123 is first conditioned by putting it in contact with the oil impregnated material 102 and a dry, chapped, or dirty finger after conditioning 125 is placed on the scanner 104, a high quality unfragmented fingerprint image 126 is captured by the computer 106 which connects to the scanner 104 with the cable set 108. The characteristic features that make each fingerprint unique (and are described further down in our invention) can be extracted easily and unambiguously from the high quality, unfragmented fingerprint image 126 to guarantee the accurate identification of a human being. The use of the oil impregnated material 104, along with the use of multiple orthogonal feature sets in fusion, allows one to build an accurate, dependable, and consistent system for the identification of a human being suitable for unattended applications, such as access control, intrusion control, positive verification for financial transactions, as well as attended applications such as fingerprinting of suspects, personal verification for financial aid recipients, and criminal identification.

Figure 5:
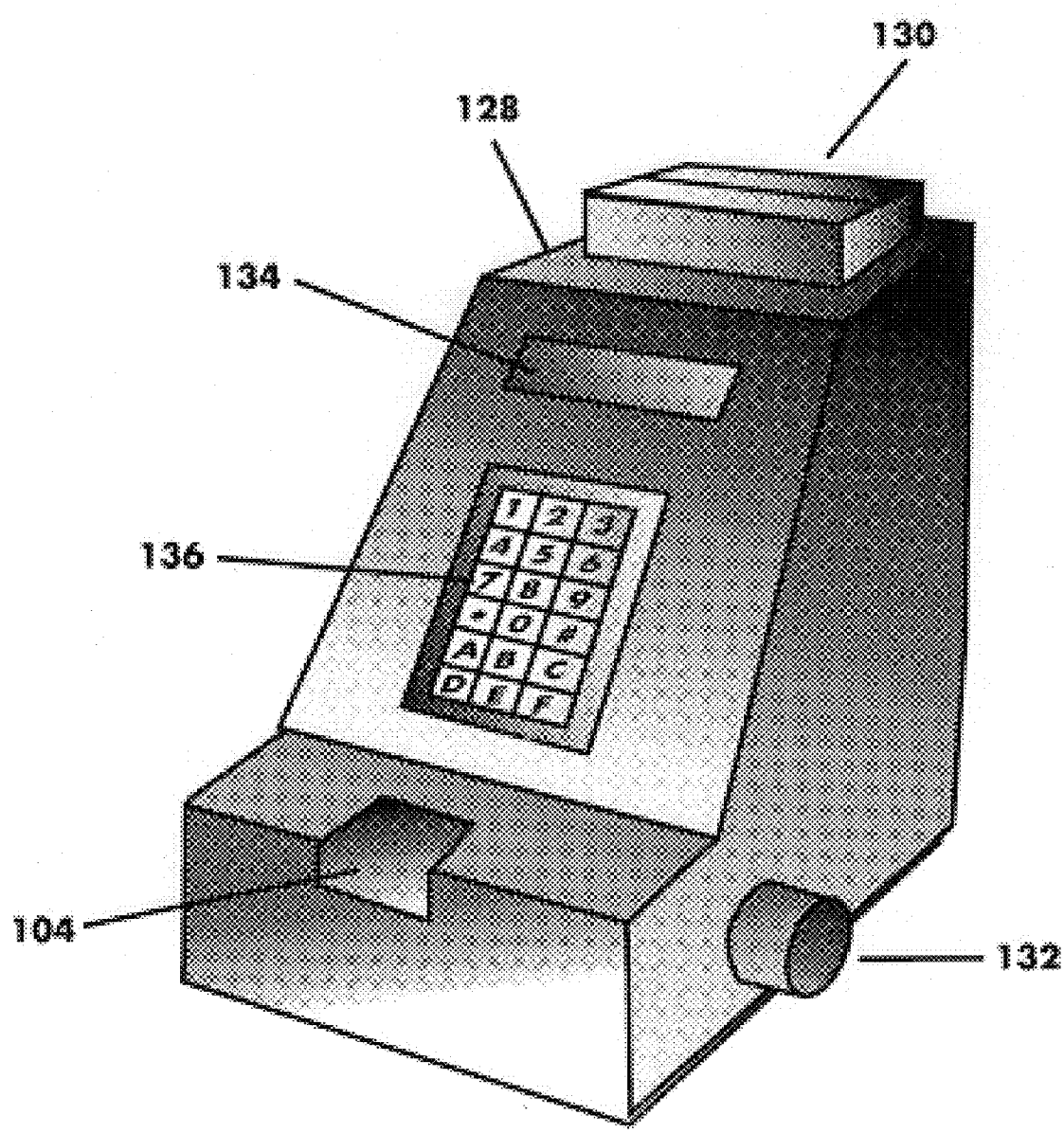
FIG. 5 is a schematic perspective view of the integrated fingerprint scanner, keypad, card reader access control with the oil impregnated conditioning material apparatus.

Referring to FIG. 5, an apparatus according to this invention is described whereby the oil impregnated material 102 is packaged in a pellet 132 and attached to an integrated man-machine interface 128 that is used in the process of identifying a human being from fingerprints. The interface 128 consists of the fingerprint scanner 104, an LCD display 134, an alphanumeric keypad 136, and a card reader 130. This interface connects to an electronic processor, either external or internal, and is used to provide accurate and unambiguous identity verification of a human being. A human being first conditions his/her finger by pressing and swiping the finger lightly against the oil impregnated pellet 132, then punching a Personal Identification Number (PIN) on the keypad or swiping or inserting a card in the card reader, or using both in combination to provide a unique ID. The integrated apparatus 128 verifies that the PIN and/or the card number are constitute a valid ID, and signals the human being to place the finger on the scanner 104. The integrated interface 128 measures the position and quality of the fingerprint image and uses visual feedback on the display 134 and audio feedback through a speaker to notify the human being to: (a) adjust the finger on the scanner 104 when the finger is not properly placed, and (b) to repeat the lubrication process if needed.

The finger 100 is determined to be positioned high or low on the scanner 104, by scanning across the finger 100 at three row locations of the fingerprint image 110. Fingerprint ridges show up as low intensity pixels against the white background intensity of the scanner 104. If the ratio of the number of low intensity pixels at a row next the top of the fingerprint image, to the number of low intensity pixels at the middle of the fingerprint image (110) is greater than a selected threshold, the fingerprint is considered to be too high, and requires re-positioning the finger 110 on the scanner 104. Determination of the quality and stability of the fingerprint image (110) prior to capturing the fingerprint image (110) is accomplished by sampling the fingerprint image at three sequential time intervals and by inspecting the relative changes in the fingerprint image 110. A fingerprint image 110 is considered suitable for acceptance and testing of the identity of said human being, if three conditions are met. The first condition is that sufficient surface of the fingerprint image 110 has been captured by the scanner 104. This is measured by comparing low intensity (non-background) pixels on the screen to a minimum threshold value indicative of a minimum surface area. If the number of pixels is greater than the threshold, this condition is considered to be true.

The second condition is that the amount of surface area is not varying with respect to time which is indicative of a fingerprint image which remains still on the scanner 104. If the number of low-intensity pixels on the captured fingerprint image 110 is below a given constant If the number of low-intensity on the screen is within a given constant count of the average number of low-intensity pixels of the average number of low-intensity pixels in the previous two samples of the fingerprint image, and fingerprint image is considered to have settled, and the fingerprint image 106 is considered to have settled and be ready for capturing.

Once the quality and position criteria are met, the fingerprint image is captured, verification of the ID takes place by matching the fingerprint against the stored templates in a database, and the human being is identified accurately. The integrated apparatus for human being identification 128 allows one to select the preferred combination of keypad or card reader, or both in combination, as a means of entering a numeric or alphanumeric ID used to retrieve a stored fingerprint record which is then match it against the scanned fingerprint image from a human being. The integrated apparatus for human being identification 128 allows one to daisy-chain in one network multiple such apparatuses for human being identification 128 of different configuration with the fingerprint scanner 104, the keypad 136, or the card reader 130 in any desired combination. The integrated apparatus for human being identification 128 comes with a built-in network interface that allows to daisy-chain multiple such integrated apparatuses each configured in any desired combination of fingerprint scanner 104, keypad 136, or card reader 130. These unique capabilities allow one to build a network of integrated apparatus for human being identification 128 whereby the same human being may be identified by providing different pieces of ID depending on the level of security, ranging from the simples alphanumeric PIN on a keypad, to information registered in a card, to live-scanned fingerprint image captured directly with a scanner, in any desired combination. This unique feature in our invention allows to build cost-effective security networks whereby the human being identification using more expensive fingerprint scanners is done at the perimeter of a compound and the most sensitive areas within, whereas access is controlled inside the perimeter and in less sensitive areas using less expensive, conventional keypad and card reading devices. Our invention allows to use the same integrated apparatus for human being identification 128 to build such an "onion-type" cost-effective human being identification network transparently using the same interface.

Figure 6:
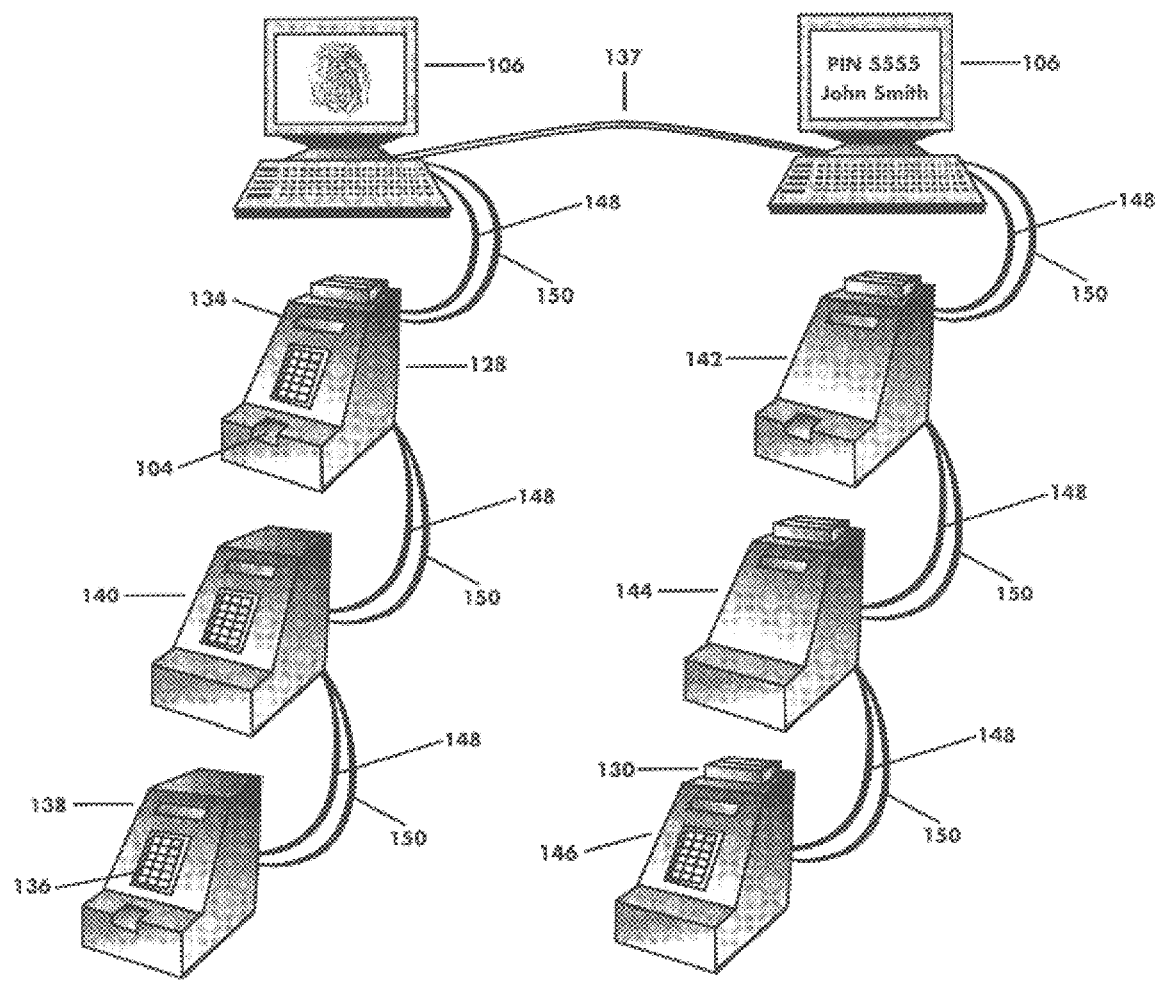
FIG. 6 is a schematic perspective view of a network of interconnected apparatuses for human being identification that can integrate a fingerprint scanner with the oil impregnated conditioning material, keypad, and card reader in any possible combination on the same network.

Referring to FIG. 6, a preferred embodiment of two daisy-chain networks 148, 150 of the integrated apparatus for human being identification 128 according to this invention, each connected to a separate host computer 106, with the two host computers interconnected via a Local Area Network (LAN) 137 is described for an access control system requiring the identification of a human being, whereby the integrated apparatus for human being identification 128 is shown configured in six different ways: (1) as an integrated apparatus 128 with fingerprint scanner 104, alphanumeric keypad 136, card reader 130, and LCD display 134; (2) as an integrated apparatus 138 with fingerprint scanner, alphanumeric keypad, and LCD display; (3) as an integrated apparatus 140 with alphanumeric keypad and LCD display; (4) as an integrated apparatus 142 with fingerprint scanner, card reader, and LCD display; (5) as an integrated apparatus 144 with card reader and LCD display; and (6) as an integrated apparatus 146 with alphanumeric keypad, card reader and LCD display. All integrated apparatuses for human being identification in Fir. 6 are networked (daisy chained) to the host PC 106 via the cable 154 for the transmission of fingerprint images from the scanner to the host PC 106, the RS485 communication line 146 which is converted to an RS232 signal line through the RS485-to-RS232 bi-directional hardware converter of this invention which is described in FIG. 11.

Figure 7:
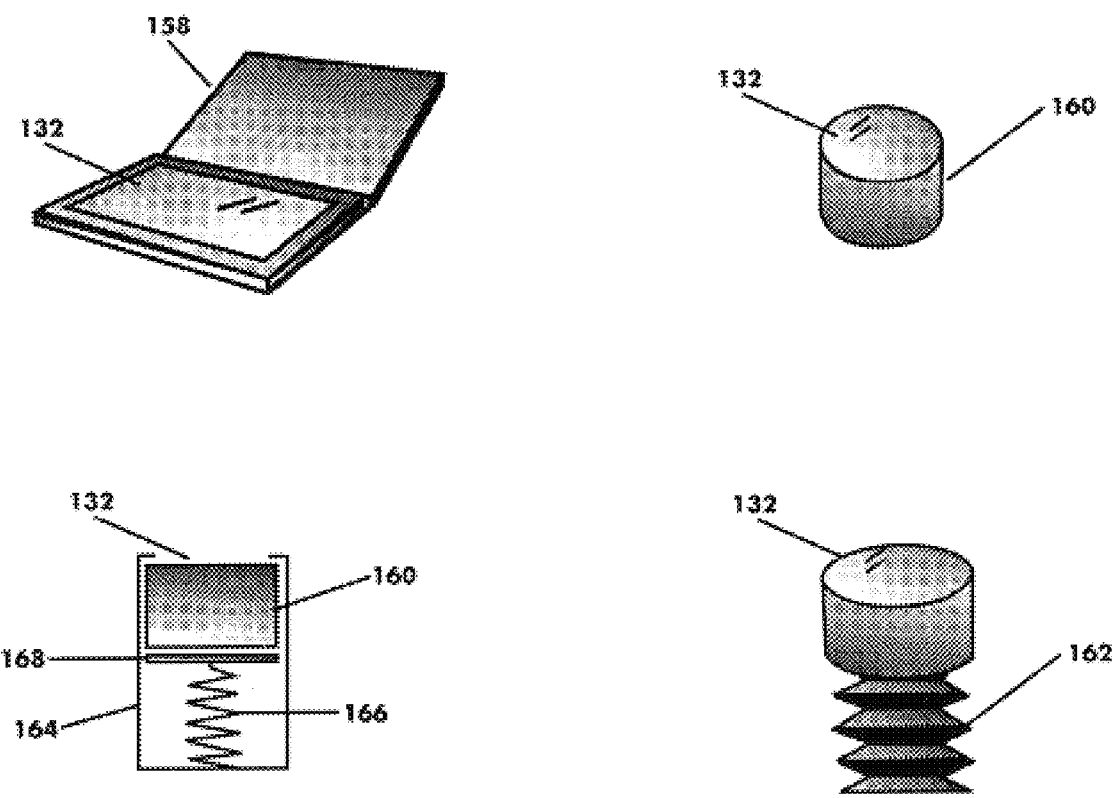
FIG. 7 is a perspective schematic view of different packaging of the oil impregnated material for finger conditioning for various typical usage's.

Referring to FIG. 7, a new use of the oil impregnated MICROPOLY material 132 manufactured by PhyMet Inc., Ohio, (or any material with similar properties) is suggested in the form of an ink-less stamp pad 158 for law enforcement fingerprint capturing and use, in the form of a pellet 132, or in a screw-shape pellet 162, or as part of a mechanical or electromechanical dispenser 164 that exerts pressure on the MICROPOLY H1 or H2 material 132 (or any material with similar oil impregnated material) inside the pellet 160 through a spring 166, to release a controlled amount of lubricant or lubricant mixture on the surface of the pellet 160.

Figure 8:
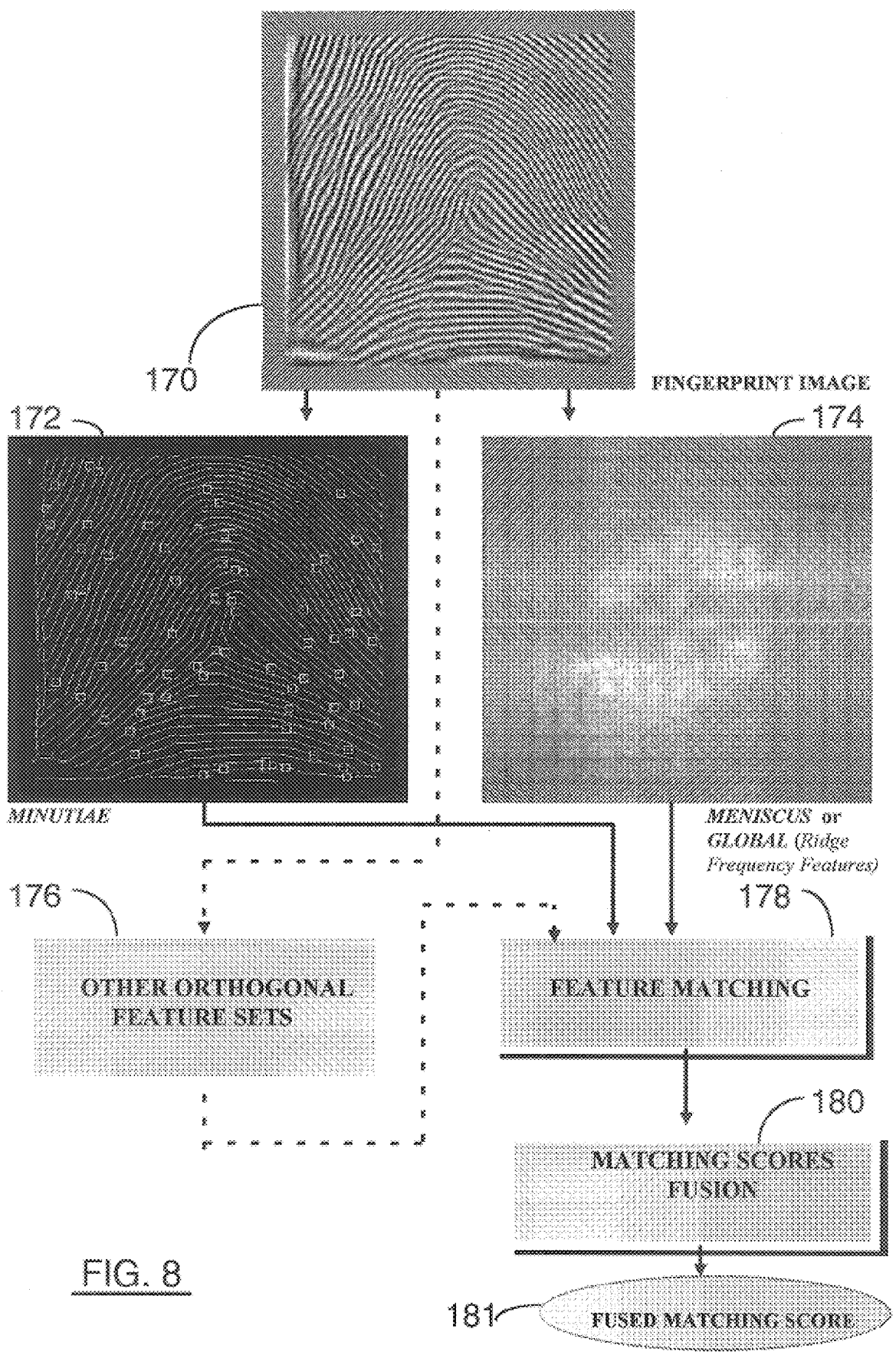
FIG. 8 illustrates a set of orthogonal features extracted from a fingerprint, namely the Minutiae (local) features, and ridge frequency (Meniscus or Global) features, and possibly others, fused together as described in this invention in order to enhance the identification of a human being.

Referring to FIG. 8, a scanned fingerprint image 170 is processed and different sets orthogonal features are extracted, consisting of Minutiae 172, Meniscus or Global ridge frequency features 174, and possibly other orthogonal features 176. These features are matched against templates stored in the database individually using a feature matching scheme 178. The individual matching scores are then fused using a matching score fusion scheme 180. The fused matching scores 181 are then used to determine the identity of a human being. Fusion of the matching scores form different orthogonal sets of features enhances the probability of correct identification and reduces the probability of false acceptance, thus making the use of fingerprints a reliable means for the identification of a human being. The Meniscus or Global features 174 have never been used previously as either a stand alone or in conjunction with Minutiae 172 features to accurately identify human beings.

Selection of the fusion method 178 is vital in order to achieve the accuracy and reliability required for the unmistaken identification of human beings from fingerprints and any related applications. Simplistic fusion methods, such as voting methods, are not adequate when dealing with matching problems in large databases. The fusion method that we invented scores the closeness of a potential fingerprint database mate for each of the data feature streams, and then integrates the scores to determine the fused matching score and make a decision. One robust method in this invention for integrating the scores from different feature sets, such as Minutiae and Meniscus (Global) ridge frequency, uses the following Linear Rank Sum (LRS) formula. Candidate matches are ranked according to the closeness of match for each of the data streams. We denote by $r_{ij}^m$ the rank score of the m-th candidate fingerprint from a database, where i indicates the fingerprint index from one of possibly ten fingers of the said candidate stored in the database, and j indicates the index of the feature representation used for matching. We denote by $N_f$ the total number of fingers from the same candidate used for matching. Typical value for $N_f$ is 1 for single finger matching. We denote by $N_r$ the total number of different feature representations (ideally orthogonal from each other) that are used (fused together) in the fingerprint matching process. Typical values of $N_r$ is 1 or 2. The total rank score $S^m$ for matching the m-th candidate is obtained by summing the ranks of the data streams into a net score according to $$s^m = \sum_{j=1}^{N_r} \sum_{i=1}^{N_f} r_{ij}^m$$

In the scoring convention used throughout this invention, the smaller the total rank score, the closer the candidate fingerprint from the data base matches the presented test fingerprint.

The resulting score from each of the candidates is evaluated to determine if a match has occurred, where a lower value of $S^m$ indicates a better match, with the best possible match score being $N_f N_r$. The advantages of this scoring formula are:

1) The use of ranking instead of the raw score provides an automatic normalization of each of the data streams scoring comparisons, which is vital for providing an accurate statistical model. The raw scores from matching a presented fingerprint to a database have significant bias depending upon the specified presented print. Rank scoring removes these biases.
2) Since the fingerprint scores are uncorrelated and the data streams are chosen for their orthogonality, linear scoring provides a distance measure which is optimal in the mean squared error sense.

Further improvement in the matching accuracy can be achieved by integrating the knowledge of the underlying distribution of the rank sums and the discriminative power of the data streams. The LRS formula is modified by weighting the individual rank scores before adding them together. The Weighted Rank Sum (WRS) formula is defined as $$s^m = \sum_{j=1}^{N_r} \alpha_j^m \sum_{i=1}^{N_f} f(r_{ij}^m)$$

One possible nonlinear function of the rank is the logarithm of the expected a priori probability of a given score.

$$f(r_{ij}^m) = \log(p_{ij}^m)$$

This gives an efficient scoring of the fingerprint record match. The coefficient $\alpha_j^m$ is used to integrate information on the quality of feature information, discriminating power of the features, and its correlation with other data.

Figure 9:
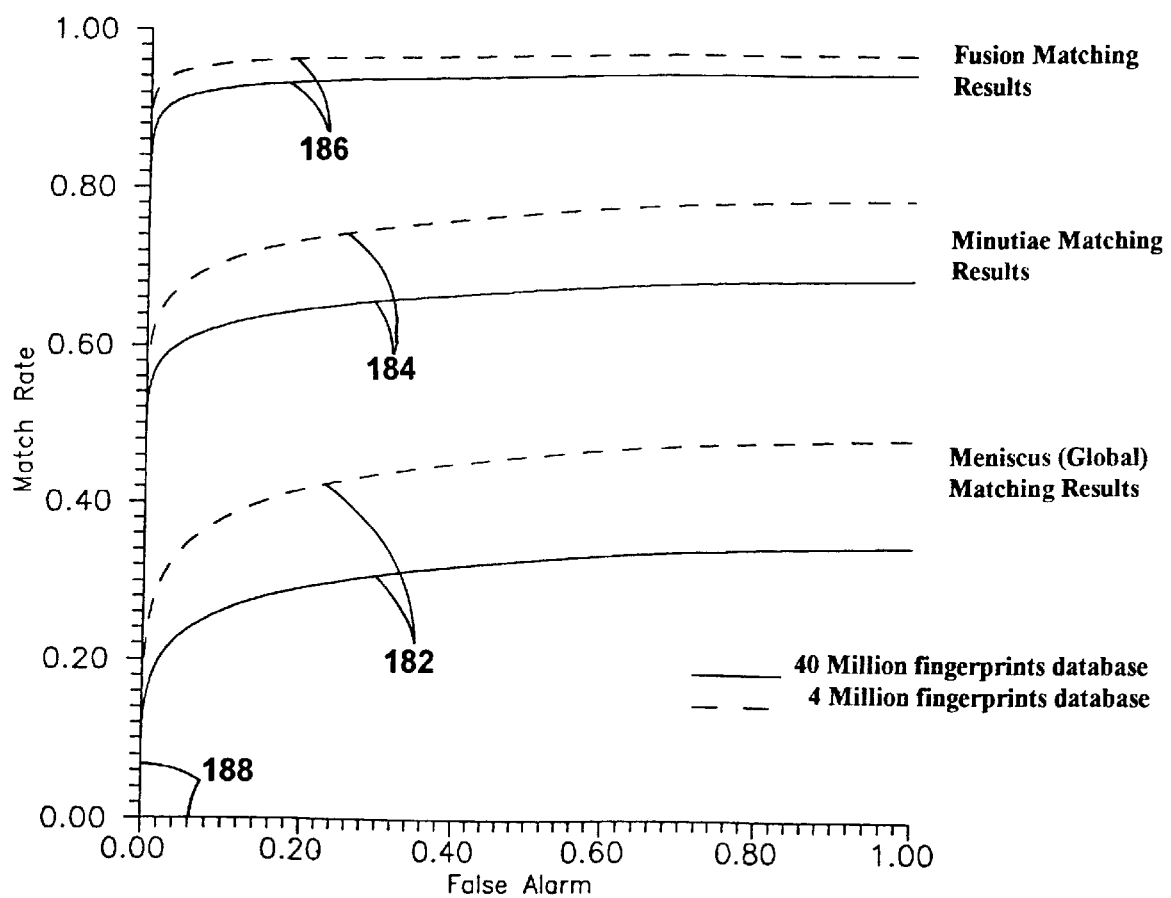
FIG. 9 illustrates comparative performance curves of the false rejection versus the false acceptance probabilities when Minutiae (local) only features are used, when ridge frequency (Meniscus or Global) features are used, and when both the orthogonal of Minutiae (local) and ridge frequency (Meniscus or Global) information are fused together.

Referring to FIG. 9, a matching characteristic from Minutiae only 182 is shown and compared against a matching characteristic from Meniscus or Global only and a matching characteristic with fused Minutiae and Meniscus (Global) 186. Comparison of the three characteristics demonstrates clearly the improvement in accuracy in terms of Match Rate (probability of correct identification) versus probability of False Alarm (probability of false acceptance) when the two orthogonal features sets, namely the Minutiae and Meniscus (Global) are fused together as opposed to using the each feature set separately. The performance has been extrapolated from experimental data from a 10,000 fingerprint database to 4 million fingerprint and 40 million fingerprint databases using a worst case statistical extrapolation model. The numerical validation is done using a single fingerprint ($N_f=1$) for matching with two orthogonal features in the fusion $N_r=2$. The Linear Rank Score (LRS) formula $$s^m = \sum_{j=1}^{2} r_{1j}^m$$

is used to compute the fused total score for each fingerprint.

To obtain the performance characteristics of FIG. 9, 10,000 fingerprint images from the NIST (National Institute of Standards and Technology) database were used (5000 fingerprints of two separate rolling each). Based on finger location, fingerprint images were reorganized into 10 separate "finger databases" of approximately 1000 fingerprints each. Rank placement distributions for the Minutiae and Meniscus (Global) feature matching methods were collected by removing one image from a finger database and attempting to find its mate among the remaining fingerprint images in that finger database. Information on rank placement of mate in the database was stored. This was repeated for all images in the finger database, and the results were averaged over the 10 "separate databases" and histogramed.

In order to be able to project the results for larger databases, conservative assumptions were made about the distribution of larger databases. The first assumption was that the histogram results were a fair distribution of the underlying database. For this proof of concept experiment, there are enough underlying data points to make this assumption acceptable. The second assumption was that the histogram bins could be scaled uniformly for larger databases. In other words, the probability that a fingerprint match ranks nth out of a size 100 database is equal to the probability that a fingerprint would be in the nth percentile in a larger database. Therefore for larger databases, we can use the same probability densities as used for the size 100 database with a reinterpretation of the domain. Since the underlying rank probability function is decreasing, uniform scaling is predicted to provide a conservative estimate of expanded database performance.

For the fusion matching method, the Linear Rank Sum (LRS) score $s^m$, for each comparison between a presented fingerprint and a database fingerprint is:

$$s^m = \sum_{j=1}^{2} r_{1j}^m$$

Given that the Minutiae and Meniscus (Global) feature sets are orthogonal and statistically independent, their rank scores are also independently distributed random variables. Thus, the distribution of the total fused rank score can be obtained as the convolution of the Minutiae rank score distribution and the Meniscus (Global) rank score distribution according to:

$$p(s^m) = p(r_{11}^m) * p(r_{12}^m)$$

From this distribution the characteristic probability of detection, same as probability of positive identification, against the false alarm probability, same as probability of false acceptance, in FIG. 9 can be obtained by varying the decision threshold, which is a constant measured against the score probabilities to allow the desired tradeoff between false acceptance and false rejection, on $p(s^m)$.

Figure 10:
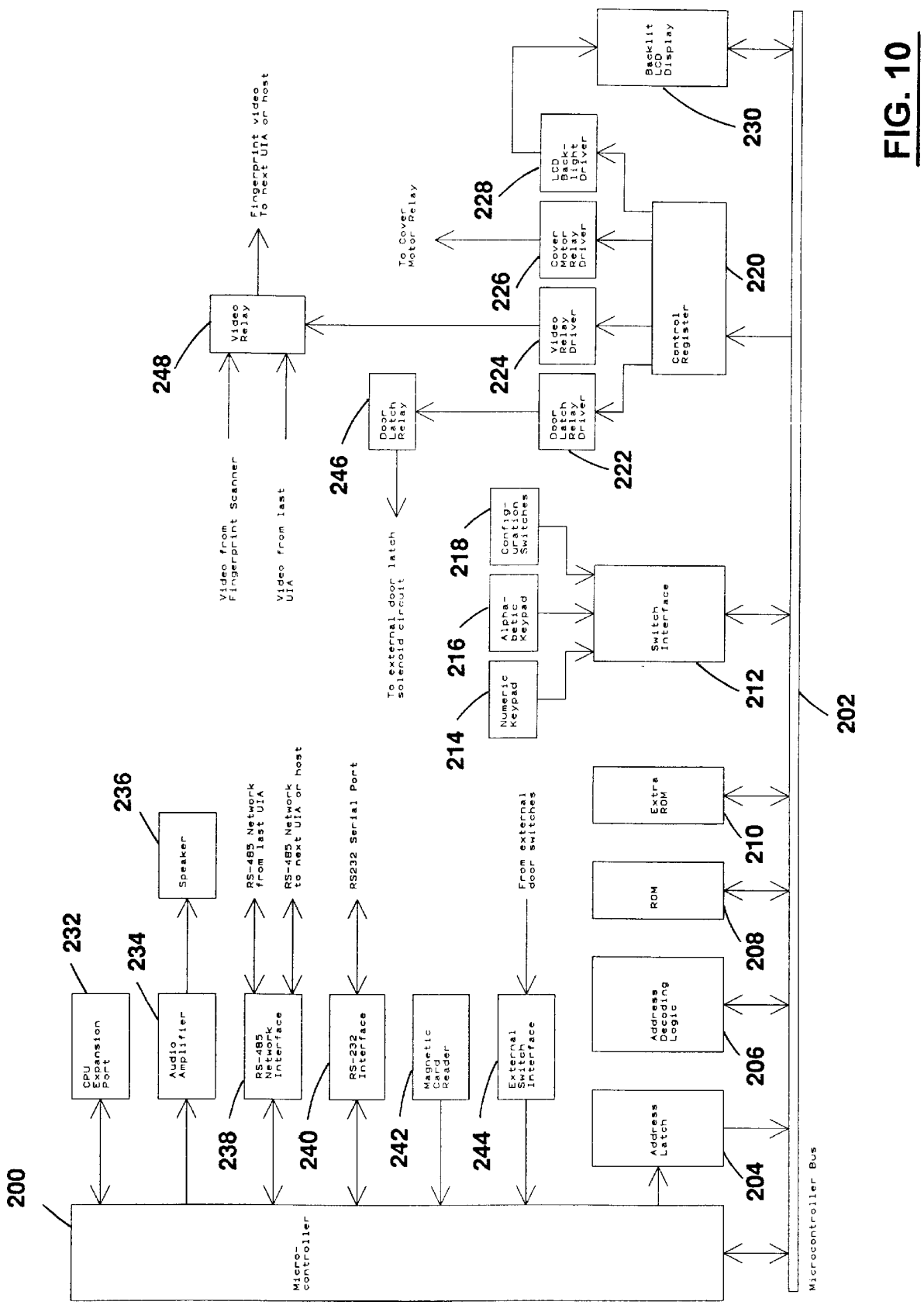
FIG. 10 illustrates a block diagram implementation of the invented apparatus that is capable of interfacing information from a fingerprint scanner, keypad, and card read in any possible combination and interconnect multiple such apparatuses in a network by either daisy-chaining or via a local area network.

Referring to FIG. 10, a block diagram implementation of the User Interface Assembly (UIA™) of the invented integrated system for identification of human beings from fingerprints and/or PINs and electronic cards is shown, which comprises:

a Microcontroller 200 which is the heart of the UIA and runs all the other chips;

a Microcontroller Bus 202 which contains the address, data, and control signals for the microcontroller to communicate with the other chips in the UIA;

an Address Latch chip 204 which latches the lower eight bits of the sixteen bit address and is required because the microcontroller shares the data bus with the address bus;

an Address Decoding Logic chip 206 which decodes the address on the address bus to select which chip gets accessed by the microcontroller;

a ROM (Read Only Memory) 208 which contains the program the microcontroller executes;

an Extra ROM 210 which is optional and does not affect the design of the interface. This is a socket where extra ROM can be added as needed. It can also be filled with RAM, or be used to program EPROM (Erasable Programmable Read Only Memory) chips in the field to upgrade the ROM with;

a Switch Interface 212. This circuitry consists of an interface adapter chip and a diode matrix to connect to the rows and columns of the keypad matrices for the Numeric Keypad, the Alphabetic Keypad, and the Configuration Switches;

a Numeric Keypad 214 which is where users enter their PINs and operate the UIA;

an Alphabetic Keypad 216 that allows one to configure UIA to be configured to accept an optional full alphabetic keypad for entering alphanumeric passwords;

Configuration Switches 218 which are DIP switches internal to the UIA that are set to tell the host computer which features are installed in the UIA and the UIA's network address;

a Control Register 220 which is a bit addressable register to add more output lines to the microcontroller and is used by the microcontroller to activate the various relays and the LCD backlight through this register;

a Door Latch Relay Driver 222, which is a transistor used to drive the relay coil on the Door Latch Relay;

a Door Latch Relay 246 with high current contacts which is connected to a terminal strip in the back of the UIA and turns on the current to the door solenoid to let the user in the door;

a Video Relay Driver 224, which is a transistor to drive the relay coil on the Video Relay;

a Video Relay 248 which is used to select between the video signal from the fingerprint scanner and the incoming video from the other scanners on the network, and feeds its output to the next UIA, or to the host computer's video digitizer.

a Cover Motor Relay Driver 226, a transistor which is used to drive an external relay to run a motor to cover and uncover the fingerprint scanner;

an LCD Backlight Driver 228, a transistor which is used to drive the LEDs inside the LCD display for backlighting;

a Backlit LCD Display 230 which is a two row by 20 column LCD display with LED backlighting and it is interfaced to the microcontroller bus so the microcontroller can write to and read from it;

a CPU expansion port 232, which is a connector from the unused lines of the microcontroller for interfacing to test equipment, or for connection to future accessories;

an Audio Amplifier 234, which is a single chip audio amplifier to drive the speaker with tones generated by the microcontroller;

a Speaker 236, which is a speaker to reproduce the tones generated by the microcontroller;

an RS-485 Network Interface 238, which is a chip that converts the 5 volt Transistor-Transistor Logic (TLL) signals from the microcontroller into RS-485 level signals for transmission over long distances and also controls when the UIA is transmitting on the network, because only one device may transmit at a time;

an RS-232 Interface 240, which is a chip that converts the 5 volt TTL signals from the microcontroller into RS-232 level signals for connection to a standard PC serial port and is also used for development and testing, using the UIA without the RS-485 network, or connection to accessories;

a Card Reader 242 which sends the number encoded on the magnetic stripe of a card, chip of a smart card, bar code of a bar code card, or by any other electronic means on a card, to the microcontroller when a card is pulled through it;

an External Switch Interface 244 which is a passive filter circuit to connect up to two external switches to the microcontroller so that the microcontroller can tell the host when the door is open, or when some other switch is activated.

Figure 11:
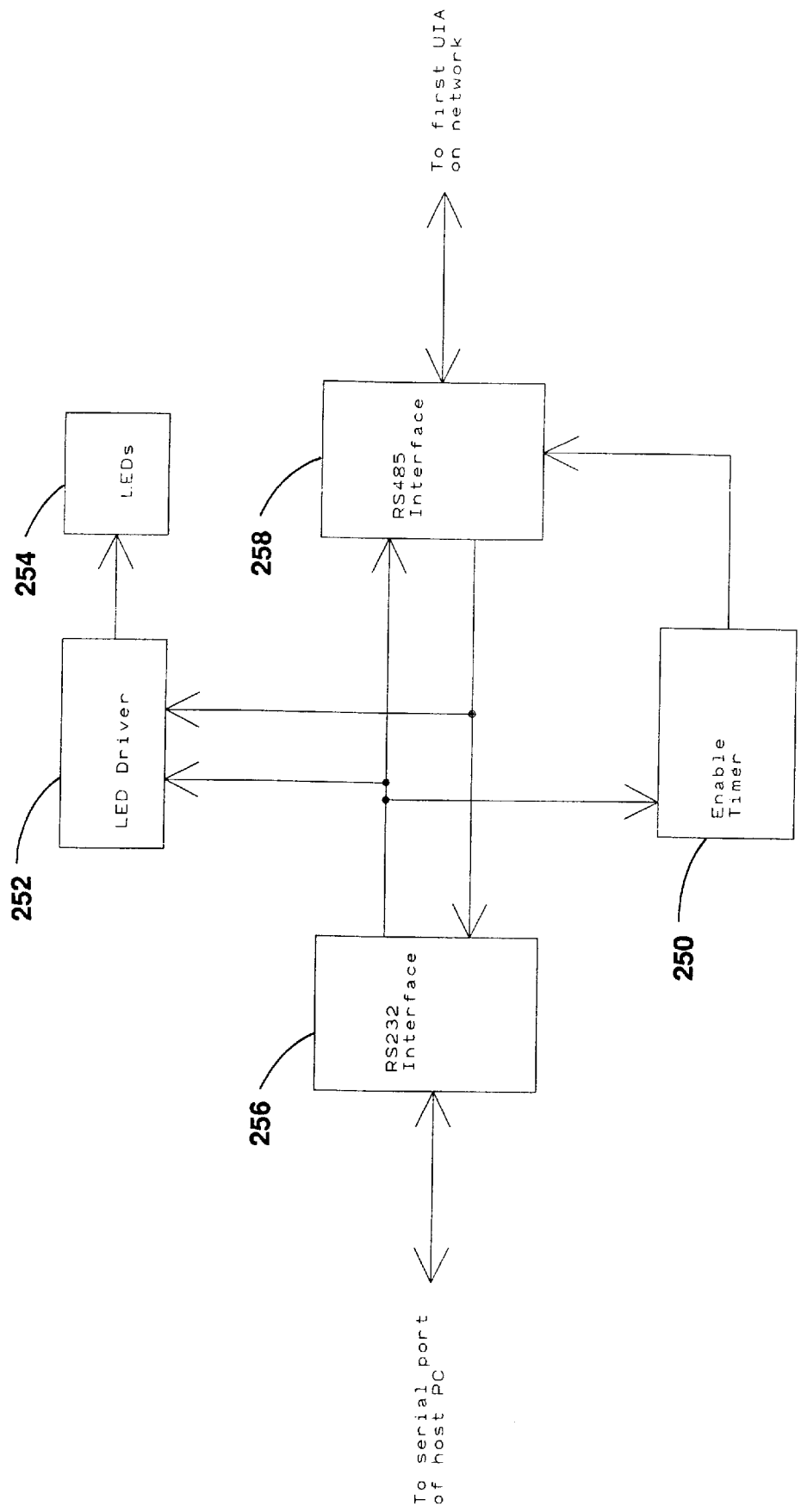
FIG. 11 illustrates a block diagram implementation of the invented inexpensive bi-directional RS485-to-RS232 converter for long-distance networking of the invented apparatuses for identification of a human being.

Referring to FIG. 11, an inexpensive RS485-to-RS232 converter is shown comprising of:

an inexpensive one-shot Enable Timer 250 enabling the transmission of data of the RS485 network for a set time period from the last mark bit sent out by the host PC and the bi-directional conversion of the data format from RS485 to RS232;

an RS232 Interface 256 which is the chip that converts the RS232 level signals to and from the host computer to appropriate volt TTL level signals;

an RS485 Interface 258 which converts the 5 volt TTL level signals to and from the RS232 interface, into RS485 level signals to drive the network;

an Enable Timer 250 which is a circuit that consists of a one-shot timer that enables the transmission of data on the RS485 network for a set time period from the last "mark" bit sent out by the host computer. This automatic enabling feature is necessary for the host software to work under Windows. That is because conventional RS485 converters on the market require the Request To Send (RTS) line to be controlled by the host software to enable transmission on the network. The RTS is one of the lines on the standard;

an RS-232 port that tells the receiving computer that the sending end has information to send. Use of the RTS line enables transmission on the RS485 adapters. Windows operating system does not allow a software program to control the RTS line. Automatic versions are available but are very expensive because of the accurate digital timing circuitry required. This innovative design uses an inexpensive analog timing circuit with loose timing tolerances for the special case where the network protocol does not require disabling of the transmitter the instant the last bit is sent. The UIAs have been designed with such a protocol. The Enable Timer circuit is implemented with half of a very inexpensive quad comparator IC. The total number of chips required for the entire RS485 converter is only three;

an LED Driver 252, a circuit that consists of the other half of the quad comparator used by the Enable Timer, and drives a red LED when the host PC is transmitting on the network, and a green LED when a UIA is transmitting on the network;

leeds 254 that LEDs indicate usage of the network for diagnostic purposes.

BEST MODE—SUMMARY

1. A method for accurately determining identity of a human being comprising the steps of:
   a. conditioning a finger (100) of said human being by bringing said finger in contact with a material or device (102) that releases a controlled amount of lubricant on the surface of said finger containing unique identifying characteristics;
   b. capturing a fingerprint image (110) of said lubricated finger (103) electronically with a scanner (104) or by leaving an imprint of said finger mechanically on a surface; and
   c. identifying said human being either by processing said fingerprint image electronically with a computer (106) or manually by visual inspection.
2. A method according to claim 1 wherein probability of false rejection is minimized by sampling three fingerprint images (110) of said finger (100) with said scanner (104) at three sequential time intervals and by inspecting the relative changes in said three sequential fingerprint images to determine whether sufficient portion of said finger is present in the field of view of said scanner (104), and said finger (103) contact area with said scanner (104) is stationary.
3. A method according to claim 1 wherein said probability of false rejection is minimized by electronically monitoring position of said finger (103) on said scanner (104) to determine whether said finger (103) is placed too high or too low on said scanner (104), and instruct said human being using audio and visual feedback to adjust said finger (103) position up or down, or sideways on said scanner (104).
4. A method for achieving superior identification of a human being comprising the steps of:
   a. extracting Minutiae (172) from said fingerprint image and feature matching (178) said Minutiae (172) by ranking against other Minutiae templates in a database;
   b. extracting Meniscus or Global ridge frequency features (174) from said fingerprint image (170) and feature matching (178) by ranking said Meniscus or Global ridge frequency features (174) by ranking said Meniscus or Global ridge frequency features against candidate templates from said finger (103) in said database;
   c. fusion (180) of rank scores from said Minutiae (172) features with said Meniscus or Global (174) ridge frequency feature sets to achieve superior identification accuracy of said human being.
5. A method for improving the quality of a fingerprint image (126) from a dry, chapped, or dirty finger (123) of a human being, comprising:
   a. use of an oil impregnated material (102), or a similar material impregnated with lubricant or mixture of lubricant with fragrant and disinfectant capable of releasing a controlled amount of lubricant on said finger (123) under contact or pressure;
   b. use of a scanner (104) for capturing a high quality unfragmented fingerprint image (126) of conditioned dry, chapped, or dirty said finger (125) for identifying said human being.
6. An apparatus for improving quality of a fingerprint image (126) of a human being comprising:
   a. the use of oil impregnated MICROPOLY material (132), or equivalent material impregnated with lubricant or mixture of lubricant with fragrant and disinfectant, in the form of inkless stamp pad (158), pellet (132), screw-on pellet (162), or an electromechanical dispenser (164), that includes said pellet (160) of oil impregnated MICROPOLY material (132) and a plate (168) and spring (116) mechanism to exert pressure on said pellet (160), each capable of releasing a controlled amount of lubricant on finger 123) under contact or pressure; and
   b. means for capturing a high quality unfragmented fingerprint image (126) of said conditioned finger (125) for identifying said human being.
7. An apparatus (128) for identification of a human being from fingerprints comprising:
   a. a pellet (132) of oil impregnated MICROPOLY material (132), or equivalent conditioning material or device to lubricate, clean, deodorize, or disinfect a finger prior to placing said finger on a scanner (104);
   b. a scanner (104) for capturing a fingerprint image (126);
   c. means for identifying said human being by extracting features from said fingerprint image and comparing and matching said features with features from other fingerprint images in a database.
8. An apparatus for transmitting data on a serial RS232 port of a computer (106) over longer distance, comprising:
   a. an enable timer (250);
   b. an LED driver (252);
   c. LEDs (254);
   d. an RS232 interface (256);
   e. an RS485 interface (258); and
   f. means for providing bi-directional inexpensive conversion of a RS485 signal line 148 to RS232 signal line.

The following references are incorporated herein:

Thomopoulos, S. C. A., and Reisman, J. G., *Fusion-based, High Volume Automated Fingerprint Identification System (AFIS)*, Proceedings of SPIE Vol. 2093, pp. 584–591.

We claim:

1. A method for accurately determining identity of a human being comprising the steps of:
   a. conditioning a finger of said human being by bringing said finger in contact with a solid piece lubricant dispenser that releases a controlled amount of lubricant on the surface of said finger containing unique identifying characteristics;
   b. sampling three fingerprint images of said finger with an electronic (live) scanner at three sequential time intervals and by inspecting the relative changes in said three sequential fingerprint images to determine whether sufficient portion of said finger is present in the field of view of said scanner, and said finger contact area with said scanner is stationary;
   c. monitoring position of said finger on said scanner to determine whether said finger is placed too high or too low on said scanner, and instruct said human being using audio and visual feedback to adjust said finger position up or down, or sideways on said scanner;
   d. capturing fingering image of said lubricated finger electronically with a scanner and transmitting it to a computer; and e. identifying said human being by processing said fingerprint image electronically with a computer.

2. A method for improving the quality of a fingerprint image from a dry, chapped, or dirty finger of a human being, comprising:

a. use of a solid piece lubricant dispenser consisting of an oil impregnated porous material that releases a controlled amount of lubricant or mixture of lubricant with fragrant and disinfectant under contact or pressure;

b. use of a scanner for capturing a high quality unfragmented fingerprint image of conditioned dry, chapped, or dirty said finger for identifying said human being.

3. An apparatus for improving quality of a fingerprint image of a human being comprising:

a. the use MICROPOLY material, impregnated with lubricant or mixture of lubricant with fragrant and disinfectant, in the form of solid piece lubricant dispenser capable of releasing a controlled amount of lubricant on finger under contact or pressure; and b. means for capturing a high quality unfragmented fingerprint image of said conditioned finger for identifying said human being using a live scan fingerprint reader, an interface to transfer captured image to a processor, and a computer to extract features from said fingerprint and match them against a database.

4. An apparatus for identification of a human being from fingerprints comprising:

a. a solid piece pellet of oil impregnated MICROPOLY material to lubricate, clean, deodorize, or disinfect a finger prior to placing said finger on a scanner;

b. a scanner for capturing a fingerprint image; and c. means for identifying said human being by extracting features from said fingerprint image and comparing and matching said features with features of other fingerprint images stored in a database.

* * * * *